May 8, 1923.

H. J. EBERHARDT

PROCESS FOR CUTTING GEAR WHEELS

Filed Jan. 2, 1920

Henry J. Eberhardt INVENTOR

BY
Fred R. Schuetz
ATTORNEY

May 8, 1923.
H. J. EBERHARDT
PROCESS FOR CUTTING GEAR WHEELS
Filed Jan. 2, 1920
1,454,430
2 Sheets-Sheet 2
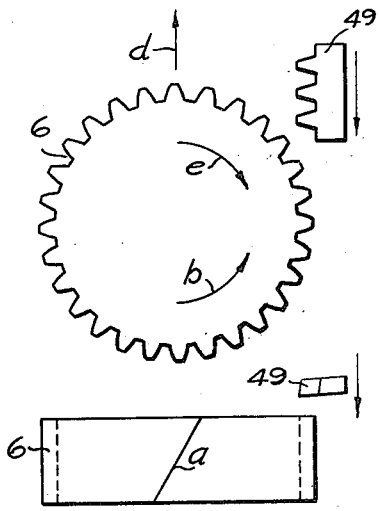
Fig-2
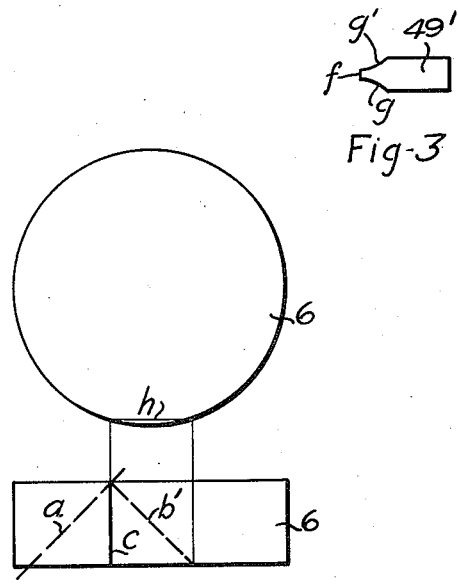
Fig-3
Fig-4
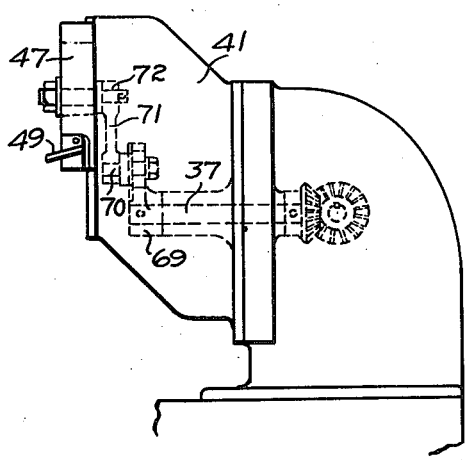
Fig-5
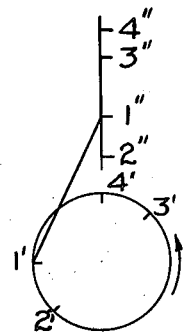
Fig-6
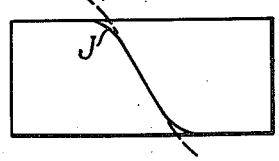
Fig-7
Henry J. Eberhardt INVENTOR
BY
ATTORNEY Patented May 8, 1923.

1,454,430

UNITED STATES PATENT OFFICE.

HENRY J. EBERHARDT, OF NEWARK, NEW JERSEY, ASSIGNOR TO NEWARK GEAR CUTTING MACHINE CO., OF NEWARK, NEW JERSEY, A CORPORATION OF NEW JERSEY.

PROCESS FOR CUTTING GEAR WHEELS.

Application filed January 2, 1920. Serial No. 348,958.

*To all whom it may concern:*

Be it known that I, HENRY J. EBERHARDT, a citizen of the United States, and a resident of Newark, in the county of Essex and State of New Jersey, have invented certain new and useful Improvements in Processes for Cutting Gear Wheels, of which the following is a specification.

The invention relates primarily to a process of cutting teeth in the art of spur or helical gearing without the necessity of arresting the relative motion between a blank to be cut and its cutting tool, more particularly when the latter is in the nature of a reciprocating planing tool.

The object of my invention is to provide a process for the cutting of spur or helical gear wheels with a reciprocating tool of rack form by imparting to both blank and tool continuous uninterrupted motion in contradistinction to an interrupted and discontinuous relative motion as has been the practice heretofore.

Various expedients have heretofore been resorted to in gear planing machines for indexing the work for cutting different numbers of teeth. In these machines it has been the practice, generally, to arrest and to disconnect temporarily, the blank turning mechanism, or the tool propelling mechanism, to allow various spring, friction or sharp edge timing devices to operate for the purpose of indexing the blank.

Such expedients are relatively unreliable and very likely to get out of order.

My improved process obviates all of the above objectionable features by providing a smooth, continuous and uninterrupted motion for simultaneously indexing the gear blank, operating the cutter and producing the tooth form.

The extra time required for interrupted indexing is thereby also saved by practicing my invention.

The novel process, moreover, provides for more accurate planing of the teeth, particularly of very large and heavy gears where the alternate starting and stopping of the blank or tool slides tends to loosen and shift the various parts, causing nonuniform or thick and thin teeth. The arresting and reversal of mechanisms in previous processes entails further difficulties by causing backlash and lost motion in the gearing and loosening of controlling screws and nuts.

The process affords, also, a means for cutting teeth, parallel to the gear blank axis as well as at various angles thereto, thru a resultant motion which is effected between the periphery of the blank being cut and the straight path of reciprocation of the planing tool, whereby all lead gear trains heretofore used for producing helices, are dispensed with as well as the necessity of dealing with complicated mathematical formulæ heretofore used for synchronizing the rotational and feeding motions.

This process, furthermore, is applicable to gears to be cut with a formed planing tool which contains in itself the desired tooth curve, or with a planing tool guided by a tooth curve form, or with a straight sided generating tool with single or multiple cutting edges. The above mentioned planing tools are well known in the art and no novelty is claimed in their use per se.

This process is applicable to theoretically straight spur or helical teeth or to approximately correct teeth known as sinusoidal.

A sinuate tooth form as may be produced by my improved process affords a tooth which is especially valuable in helical and herringbone gearing where the in-and-out bends at the ends of the sinuate teeth add to the smoothness of rolling action as the teeth of a train of wheels approach and recede from each other.

The accompanying drawings set forth in detail certain mechanism for carrying out my novel process, said means constituting, however, but one of the various mechanical forms in which the principle of the invention may be embodied.

In the drawings, Figure 1 is an elevation of the apparatus embodying the features necessary to practice this invention.

Figure 2 is a diagrammatic view illustrating gear generation.

Figure 3 is a simple form of tool.

Figure 4 is a diagram of resultant motions.

Figure 5 is an alternative crank motion.

Figure 6 is a crank motion velocity diagram.

Figure 7 is a sinusoidal curve diagram.

Similar characters of reference designate corresponding parts throughout the several views.

Figure 1:
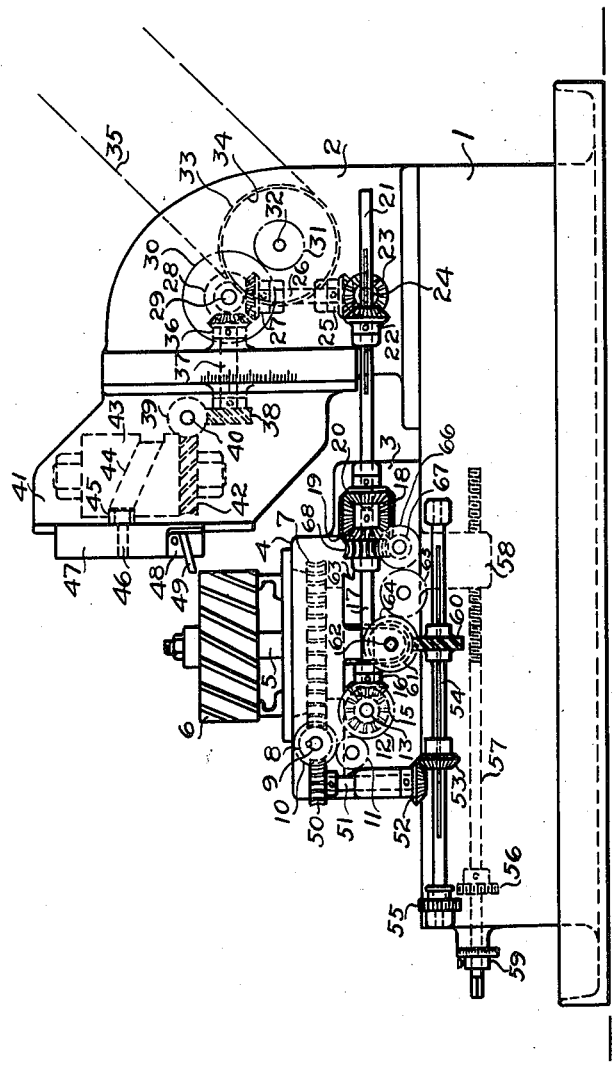

Referring to the drawings, one type of mechanism for practicing the invention is shown and it consists of a main frame 1 provided with a stanchion 2 at one end thereof, a work slide 3 longitudinally adjustable on the main frame 1 and provided with a transverse work slide 4 adjustably mounted thereon. The latter work slide 4 is provided with a revoluble work spindle 5 therein upon which the gear blank 6 may be centered and secured in the usual way.

A worm or index wheel 7 is secured to the lower end of the work spindle 5 and is adapted to be rotated by a worm 8 in engagement therewith, and slidably mounted on a worm shaft 9 provided at one end with a change gear 10 in train with change gears 11 and 12. The latter receive motion from a transverse shaft 13 thru a bevel gear 15 secured thereto and driven by a bevel gear 16 mounted on a longitudinal shaft 17 which receives power preferably thru a differential revolving member 18. This member is in contact simultaneously with a reaction bevel wheel 19 and a direct action bevel wheel 20, which in turn receives power from a slidably adjustable shaft 21 driven by bevel gears 22 and 23 secured to a shaft 24 on the inner end of which, a bevel gear, of same size as the gear 23, receives power from a bevel gear 25 secured to a vertical shaft 26. Upon the upper end of this shaft is secured a bevel gear 27 receiving power from a bevel gear 28 mounted on a horizontal and transverse shaft 29 having a change wheel 30 mounted at one end and in mesh with a driving change wheel 31 mounted on one end of a longitudinally disposed shaft 32. At its opposite end are mounted tight and loose pulleys 33 and 34, respectively, which receive motion from any suitable source of power as a belt 35. The foregoing description sets forth a train of mechanism for continuously revolving the gear blank 6. The particular differential mechanism described is not absolutely essential in this machine as other well known expedients may be substituted, but as a rule they require lengthy and tedious calculations to correctly synchronize the tooth producing element, work and feed motions as is well understood in the art.

The reciprocating mechanism for the tooth producing element may be arranged as follows:—In mesh with the bevel gear 28 and driven by it, is a bevel gear 36 mounted on a central shaft 37 rotatably secured in the stanchion 2 and having mounted on its opposite end a worm gear 38 of steep angle type meshing with a worm 39 secured on a horizontal shaft 40 which is mounted in a swivel housing 41 and at right angles to the shaft 37. Worm 39 meshes with and drives a worm gear 42 secured to a vertical cam drum 43 mounted in the housing 41 and at right angles to shaft 40. The cam drum has a helical groove 44, formed on its periphery, co-acting with a cam roller 45 mounted on a stud 46 secured in a ram 47 slidably mounted on the swivel housing 41 and carrying a clapper box 48 and a rack element or planing tool 49 secured therein.

The description thus far described embodies, substantially, my invention in that it shows mechanism for continuously rotating a cylindrical gear blank and simultaneously therewith continuously reciprocating a rack element or planing tool in time with the said blank. I do not restrict myself, however, to the use of a cam-grooved drum for producing reciprocation of the ram and tool head, as various other mechanisms may be employed, such as the crank pin and link shown in Fig. 5 and hereinafter more fully set forth. Nor do I desire to restrict myself to the particular form of the rack element or tooth producing instrumentality.

For feeding, the worm shaft 9 has secured to it a worm not shown, driving a worm wheel 50 secured to a shaft 51 vertically mounted in bearings secured to the longitudinal slide 3 and having a bevel gear 52, secured to its lower end, meshing with a bevel gear 53 slidably secured to a horizontal shaft 54 which is rotatably secured in bearings mounted on the frame 1. At the outer end of shaft 54 is secured a sliding gear 55 adapted to engage with a driven gear 56 secured to a horizontal and longitudinally disposed screw 57 engaging a nut 58 mounted on the slide 3. The outer end of screw 57 is squared and there is provided also a graduated dial 59 which is adjustably secured to the screw 57.

The shaft 54 has a helical gear 60 slidably secured upon it and meshing with a helical gear 61 loosely mounted on a transverse screw 62 and adapted to be clutched to screw 62 in a well known manner (not shown). Screw 62 engages with the slide 4 adapted to slide on slide 3 on guide ways 63 provided at right angles to screw 57.

At the outer end of screw 62 a change wheel 64 is secured which is engaged in train with further change wheels 65 and 66. The latter change wheel 66 is secured to a worm 67 meshing with a worm wheel 68 secured to the differential reaction bevel wheel 19. The above mechanism enables a constant feed motion, means for varying which are well known and not shown, to be transmitted from the work revolving mechanism, at a certain desired amount for each revolution of work, to either of the feeding screws: one of which will cause the blank to be moved deeper into the planing tool or tools until a desired depth is reached and the other of which will cause the blank to be moved transversely across the planing tools parallel to the pitch line.

When it is desired to use the latter tangential feed motion, the above mechanism also provides that the pitch circumference and pitch line, of blank and tool respectively, are kept in proper tangential relation.

In describing the operation of the hereinbefore described mechanism for practicing my method of cutting spur, helical or sinusoidal gear wheels, attention is called to the fact that all previous methods of cutting helical gearing required special means such as lead gear trains or complicated lead calculations in combination with the gear blank rotation.

My method requires no lead gear train as the helical cut is the resultant of the turning of the blank and the linear movement of the cutting tool, that is to say:—

The blank revolves continuously in one direction. The rack element or tool cuts on the down stroke, is separated from the work at the completion of the cutting stroke and returns to the next cutting stroke and meets the gear blank on the down stroke at the proper indexing distance, of either one or more teeth according to the angle of cut desired. In the cutting of the helical gears, the angle of tooth may be rapidly increased by causing the tool to skip one or more tooth spaces. For example, if it be desired to skip every other tooth, the blank is to be rotated twice as fast as when cutting succeeding teeth; and to skip two teeth, the blank is to rotate three times as fast.

Tooth curve generation is obtained by translating the gear blank tangentially to the tool for a distance somewhat greater than the distance between two teeth or somewhat greater than the circular pitch when using a rack tool with multiple cutting teeth. With a single rack-shaped cutting tool the amount of translation required is more, depending on the pressure angle used and consequent length of the line of action. In carrying out my method the machine is operated as follows:—

The gear blank is mounted on and secured to the work spindle, the planing tool secured to the clapper box on the reciprocatory ram and the swivel housing adjusted and secured at the proper angle with relation to the gear and according to the angle of the helices to be cut. The speed change gears 30 and 31 are secured in accordance with the material of the blank. The proper feed train is engaged to move the blank into cutting position for the planing tool or tools, and when generating tooth forms from rack shaped tools, the tangential feed gears 64, 65 and 66 are secured in accordance with the pitch circumference of the gear blank. The ratio change gears 10, 11 and 12 are secured in accordance with the number of teeth desired in the gear blank, and the machine is ready to operate and will complete a helical gear by one longitudinal passage of the blank into a single formed planing tool until the desired depth is reached, or by one tangential passage of the blank across the path of a rack shaped generating tool.

To better explain the cutting of spur gearing, I consider the spur gear as a helical gear of zero degrees; and obtain the desired zero degrees therefor by swiveling the head 41 in the opposite direction, and in amount equal to the angle that would be obtained on the gear blank were the head 41 left at zero, thereby neutralizing the angular effect and producing a tooth parallel to the axis.

Referring to Figures 2 and 4, the line (a) represents the right hand inclination of a helical gear tooth obtained as a resultant of the downward motion of the tool 49 and the counterclockwise motion of the gear blank 6, shown by arrow (b), with swivel head 41 set at zero. By swiveling the head 41, so that the ram 47 will cause tool 49 to cut along the line (b') if the blank 6 was held from rotating, the inclinations of the lines (a) and (b') would be of equal inclination but at opposite directions from a vertical line (c) representing a spur gear tooth parallel with the axis of the gear blank. In actual operation, the resultant of combining these motions simultaneously is the resultant straight spur tooth as shown by line (c).

It is obvious that when using a rack shaped tool 49, shown in Figure 2, and moving the blank 6 tangentially to tool 49 in the direction of arrow (d) and continuously revolving the blank counterclockwise, for example, as shown by arrow (b), gear generation requires the blank to be affected in the clockwise direction as shown by arrow (e).

It is also obvious that the rack tool will successively cut all the teeth at each blank revolution and slightly deeper at each revolution as the blank travels in the direction of arrow (d) until the full depth is reached, from which position, the depth of engagement will become less until the finished gear and tool pass out of engagement; regardless of whether the swivel head 41 has been adjusted to zero or at an angle to the axis of the gear blank.

The apparatus for practicing this invention is also capable of cutting gears by the formed cutter process, as, for example, when using a simple tool 49' as shown in Fig. 3. The main feeding motion is obtained by feeding screw 57, Figure 1, causing the blank to come in contact with the end (f) Figure 3, of the tool 49' along a line central with the blank and the sides (g) and (g') of the tool, only when the swivel housing 41 is secured at zero.

To cut gears with the single formed tool 49' of Figure 3, the housing 41 is swiveled at an angle to the blank axis and the blank 6 is vertically adjusted and secured on the spindle 5 in such a position that the middle of the blank will be in a line passing through the swivel center of housing 41.

Referring to Figure 4, the tool, under the conditions noted, would then travel along a path represented by line ($b'$), the top view of the path of line ($b'$) would appear as a chord ($h$) and the height of the segment subtended by the chord ($h$) is equal to the amount the tooth would be cut deeper at the center of the face of the gear blank than at the ends. The gear teeth may be cut of the same depth along their whole length by causing the gear blank to travel tangentially a distance equal to the length of the chord ($h$).

Referring to Figure 5, a crank motion for reciprocating the tool 49 is shown and it consists of the crank shaft 37 having a crank 69 secured on its outer end, upon which a crank pin 70 is adjustably mounted in the crank 69, and is adapted to engage a link 71, which in turn is swiveled to a pin 72 at the opposite end, adjustably secured in the ram 47. Shaft 37 receives motion from the same mechanism hereinbefore described. I make use of the well known varying velocity of a ram reciprocated by a crank motion, diagrammatically shown in Figure 6, by the difference in length of motion units $1'-2'$ $1''-2''$ and $3'-4'$ and $3''-4''$ and $1'-2'$ and $3'-4'$ being of equal length arcs, to produce sinusoidal toothed gearing, as shown in Figure 7. The broken line ($i$) represents the true helical form of a tooth produced as a resultant of the uniform revolving of the gear blank and the uniform cutting velocity of a tool controlled by a true helical groove 44, Figure 1, of the cam drum 43. The full line ($j$) represents the sinusoidal form of a tooth produced as a resultant of the uniform revolving of the gear blank and the varying cutting velocity of a tool controlled by a crank 69, Figure 5.

It is of course obvious that all meshing members of a train of sinusoidal helical gear wheels will be cut with all the gear blanks being placed in the center of the length of the reciprocating stroke, thereby cutting a sinusoid tooth, uniform at both ends, and interchangeable with all other sinusoid teeth of the train cut with the same length of stroke.

I claim:

1. The method of cutting gear wheels, which consists in imparting continuous rotational motion to a gear blank and a continuous reciprocation to a rack element in a plane parallel to the axis of said blank and normal to the radius thereof.

2. The method of cutting gear wheels, which consists in imparting continuous rotational motion to a gear blank and a continuous reciprocation to a rack element in a plane parallel to the axis of said blank and normal to the radius thereof and at a relative rate proportionate to the number of teeth to be cut in said gear blank.

3. The method of cutting gear wheels which consists in effecting a continuous relative rotation and continuous relative simultaneous reciprocation between a gear blank and a rack planing tool and about the axis of said gear blank and in a plane parallel to said axis respectively.

4. The method of generating gear teeth, which consists in effecting a continuous relative rotation about the axis of a gear blank, and continuous relative simultaneous reciprocation of a planing tool in a plane parallel to said axis, and continuous simultaneous translation between said gear blank and said planing tool in one direction in a plane tangential to the pitch surface of said gear blank.

5. The method of cutting gear wheels, consisting in continuously rotating a gear blank and continuously reciprocating a planing tool in a plane parallel to the axis of said gear blank so that the ratio of the number of reciprocations of the said planing tool to a whole number of revolutions of the gear blank is equal to the number of teeth to be cut multiplied by an integer.

6. The method of cutting gear wheels, consisting in continuously rotating a gear blank and continuously reciprocating a planing tool in a plane parallel to the axis of said gear blank, and timing the number of tool reciprocations in relation to the continuously rotating gear blank to control the number of teeth cut.

7. The method of cutting gear wheels, consisting in continuously rotating a gear blank and continuously reciprocating a rack-shaped planing tool in a plane parallel to the axis of said gear blank with relative speeds thru imparting a single continuous motion to said gear blank and planing tool, respectively, said relative speeds being determined by the ratio of the number of teeth to be cut to one revolution of the gear blank, plus or minus an increment dependent upon the pitch circle of the blank and upon the amount of feed desired for each rotation of the gear blank, and imparting translating motion between gear blank and rack tool tangential to the pitch circle of the gear blank.

8. The method of cutting gear wheels, consisting in continuously rotating a gear blank and continuously reciprocating a rack element in a plane parallel to the axis of said gear blank, and simultaneously imparting a differential resultant motion between said gear blank and said planing tool.

9. The method of cutting helical gear wheels, consisting in continuously rotating a gear blank and continuously reciprocating a planing tool in a plane parallel to the axis of said gear blank, and simultaneously imparting a differential resultant motion between said gear blank and said planing tool in the direction of a helical line passing around the axis of the gear blank.

10. The method of cutting helical gear wheels, consisting in continuously rotating a gear blank and continuously reciprocating a planing tool in a plane parallel to the axis of said gear blank, and simultaneously imparting a continuous translating motion to said gear blank in one direction tangential to the pitch cylinder of said gear blank.

11. The method of cutting helical gear wheels, consisting in continuously rotating a gear blank and continuously reciprocating a planing tool in a plane parallel to the axis of said gear blank, and simultaneously imparting a differential resultant motion between said gear blank and said tool in a direction at right angles to the axis of said blank and substantially tangential to the pitch cylinder of said gear blank.

12. The method of generating sinusoidal toothed gear wheels, consisting in effecting a continuous rotation of a gear blank and a continuous reciprocating motion of variable velocity of a planing tool in a plane parallel to the axis of said gear, and simultaneously imparting a resultant motion between said gear blank and said planing tool in the direction of a sinusoidal line passing around the axis of the gear blank.

13. The method of generating sinusoidal toothed gear wheels, consisting in effecting a continuous relative rotation about the axis of the gear blank and continuous relative simultaneous reciprocation of varying velocity of a planing tool in a plane parallel of said axis, and continuous relative simultaneous translation between said gear blank and said planing tool parallel to a plane tangential to the pitch cylinder of said gear blank.

14. The method of planing helical teeth, consisting in proportioning the ratio of the number of strokes of the cutting tool to the number of revolutions of the constantly rotating work so that the cutting tool misses a number of pitch intervals.

15. The method of planing helical teeth as claimed in claim 14, wherein the continuously rotating work is rotated forward between two cuts a number of pitch intervals which is not contained in the total number of teeth to be formed on the work and does not have a common measure therewith.

Signed at Newark, in the county of Essex and State of New Jersey, this 31st day of December A. D. 1919.

HENRY J. EBERHARDT.